United States Patent
Bhattacharjee et al.

(10) Patent No.: US 11,030,483 B2
(45) Date of Patent: Jun. 8, 2021

(54) GENERATING AND ORDERING TAGS FOR AN IMAGE USING SUBGRAPH OF CONCEPTS

(71) Applicant: International Business Machines Corporation, Armonk, NY (US)

(72) Inventors: Bishwaranjan Bhattacharjee, Yorktown Heights, NY (US); Tushar Nagarajan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/057,145

(22) Filed: Aug. 7, 2018

(65) Prior Publication Data

US 2020/0050895 A1 Feb. 13, 2020

(51) Int. Cl.
*G06K 9/00* (2006.01)
*G06K 9/62* (2006.01)
*G06F 16/51* (2019.01)
*G06F 16/56* (2019.01)

(52) U.S. Cl.
CPC ........... *G06K 9/6257* (2013.01); *G06F 16/51* (2019.01); *G06F 16/56* (2019.01); *G06K 9/627* (2013.01)

(58) Field of Classification Search
CPC ...... G06K 9/6257; G06K 9/627; G06F 16/51; G06F 16/56
See application file for complete search history.

(56) References Cited

U.S. PATENT DOCUMENTS

| | | | |
|---|---|---|---|
| 8,250,015 B2 | 8/2012 | Li et al. | |
| 8,572,086 B2 | 10/2013 | Soderberg et al. | |
| 9,646,226 B2 | 5/2017 | Wang et al. | |
| 9,652,561 B2 | 5/2017 | Sato et al. | |
| 9,756,091 B1* | 9/2017 | Davies | H04L 65/4015 |
| 9,904,740 B1* | 2/2018 | Ni | G06F 16/9024 |
| 10,216,766 B2 | 2/2019 | Lin et al. | |
| 10,275,499 B2 | 4/2019 | McCann et al. | |
| 2004/0249774 A1* | 12/2004 | Caid | G06K 9/4623 706/14 |
| 2011/0087629 A1* | 4/2011 | B'Far | G06F 16/254 706/46 |
| 2017/0068903 A1 | 3/2017 | Hakkani-Tur et al. | |

(Continued)

FOREIGN PATENT DOCUMENTS

| | | |
|---|---|---|
| CN | 106055538 A | 10/2016 |
| CN | 103309953 B | 2/2017 |
| KR | 20150079064 A | 7/2015 |

*Primary Examiner* — Pakee Fang
(74) *Attorney, Agent, or Firm* — Cantor Colburn LLP; Anthony Curro

(57) ABSTRACT

Aspects include a system, computer program production and computer-implemented method for tagging an image. An image classification engine stored in a memory of a computer device generates a plurality of tags for the image and uses the plurality of tags to generate a relevance subgraph for the image. An embedding engine embeds nodes and edges of the relevance subgraph into fixed dimension vectors of a matrix. A neural network stored in the memory determines a feature vector from the image. A processor applies the feature vector to the matrix to generate a context vector for the image. The context vector is used to tag the image.

20 Claims, 9 Drawing Sheets

(56) References Cited

U.S. PATENT DOCUMENTS

| | | |
|---|---|---|
| 2017/0132526 A1 | 5/2017 | Cohen et al. |
| 2018/0121785 A1* | 5/2018 | Min .................... G06N 3/0454 |
| 2019/0095806 A1* | 3/2019 | Martinez Canedo ....................... G06N 3/0454 |
| 2019/0286931 A1 | 9/2019 | Kim et al. |

* cited by examiner

US 11,030,483 B2

GENERATING AND ORDERING TAGS FOR AN IMAGE USING SUBGRAPH OF CONCEPTS

BACKGROUND

The present invention relates generally to image tagging and, more specifically, to methods and systems for generating a tag for an image using a subgraph of concepts based on the image.

The internet, and particularly social media/networking sites such as Facebook, Twitter, Flickr, Google Plus, and the like, have made it convenient for users to share photos of themselves and others online. These sites include features that allow a person who uploads a photo to label or "tag" people depicted in the photo. For example, Facebook includes functionality that allows users to locate a person who is present in a photo by clicking on the person's image in the photo and then typing a name of the person. The user can repeat this process to locate and label each person within the photo. Without a context, the tags bear no particular relation to each other. Being able to label the image to state the context of the image provides meaningful relation between tags.

SUMMARY

Embodiments of the present invention are directed to a computer-implemented method for tagging an image. A non-limiting example of the computer-implemented method includes generating a relevance subgraph for the image using tags for the image generated by an image classification engine stored in one or more memories of the one or more computing devices, the image classification engine being used to generate a plurality of tags for the image, embedding, using an embedding engine, the nodes and edges of the relevance subgraph into fixed dimension vectors of a matrix, determining, using a neural network stored in one or more memories of the one or more computing devices, the neural network engine used to generate, a feature vector from the image, applying, using a processor, the feature vector to the matrix to generate a context vector for the image; and using the context vector to tag the image.

Embodiments of the present invention are directed to a system for tagging an image. A non-limiting example of the system includes a memory having computer readable instructions and one or more processors for executing the computer readable instructions. The computer readable instructions configured to perform a method including generating a relevance subgraph from the image, the subgraph having a plurality of nodes and edges, embedding the nodes and edges of the relevance subgraph in a fixed dimension vector, determining a feature vector from the image, applying the feature vector to the fixed dimension vector to generate a context vector for the image; and using the context vector to tag the image.

Embodiments of the present invention are directed to a computer program product for tagging an image. A non-limiting example of the computer program product includes a computer readable storage medium having program instructions embodied therewith. The program instructions are executable by a processor to cause the processor to perform: generating a relevance subgraph from the image, the subgraph having a plurality of nodes and edges, embedding the nodes and edges of the relevance subgraph in a fixed dimension vector, determining a feature vector from the image, applying the feature vector to the fixed dimension vector to generate a context vector for the image, and using the context vector to tag the image.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment disclosed herein discloses a method and system for generating a context vector for an image. In various embodiments, the context vector can be used to order tags from an image to produce a contextual tag for the image. The method includes extracting a set of tags from an image using an image classification engine and generating a relevance subgraph for the image from the preliminary set of tags. The relevance subgraph is embedded into a plurality of fixed dimension vectors that are combined into a matrix representative of the image. Additionally, a feature vector is extracted from the image using a suitable algorithm, such as a neural network or a trainable classifier configured to execute a machine learning algorithm. The feature vector is applied to the matrix representation of the image in order to generate a context vector for the image. In various embodiments, the context vector is used to tag the image, to augment input features for training a system (e.g., a trainable classifier configured to execute a machine learning algorithm) for tagging or to otherwise improve a tagging process. When applying the feature vector to the matrix, the feature vector selects relevant edges or vectors from the matrix. The selected vectors or edges are combined to generate the context vector. In various embodiments, the context vector is a weighted combination of the selected relevant vectors or edges.

Neural Networks are connected computing systems modeled after the neurons in the human brain. Multiple computational layers process an input, with each layer applying more and more complex processing. A trained neural network determines an output response for an input signal.

Machine Learning gives computers the ability to "learn" without being explicitly programmed. Machine learning explores the study and construction of algorithms that can learn from and make predictions on data. Such algorithms overcome following strictly static program instructions by making data-driven predictions or decisions, through building a model from sample inputs. Machine Learning can be supervised, unsupervised or reinforced. In supervised learning, a computer is presented with example inputs and their desired outputs, given by a "teacher," with the goal of learning a general rule that maps inputs to outputs. In unsupervised learning, no labels are given to the learning algorithm, leaving it on its own to find structure in its input. Unsupervised learning can be a goal in itself (such as discovering hidden patterns in data) or a means towards an end (such as feature learning). In reinforcement learning, a computer program interacts with a dynamic environment in which it must perform a certain goal (such as driving a vehicle or playing a game against an opponent). The program is provided feedback in terms of rewards and punishments as it navigates its problem space.

Figure 1:
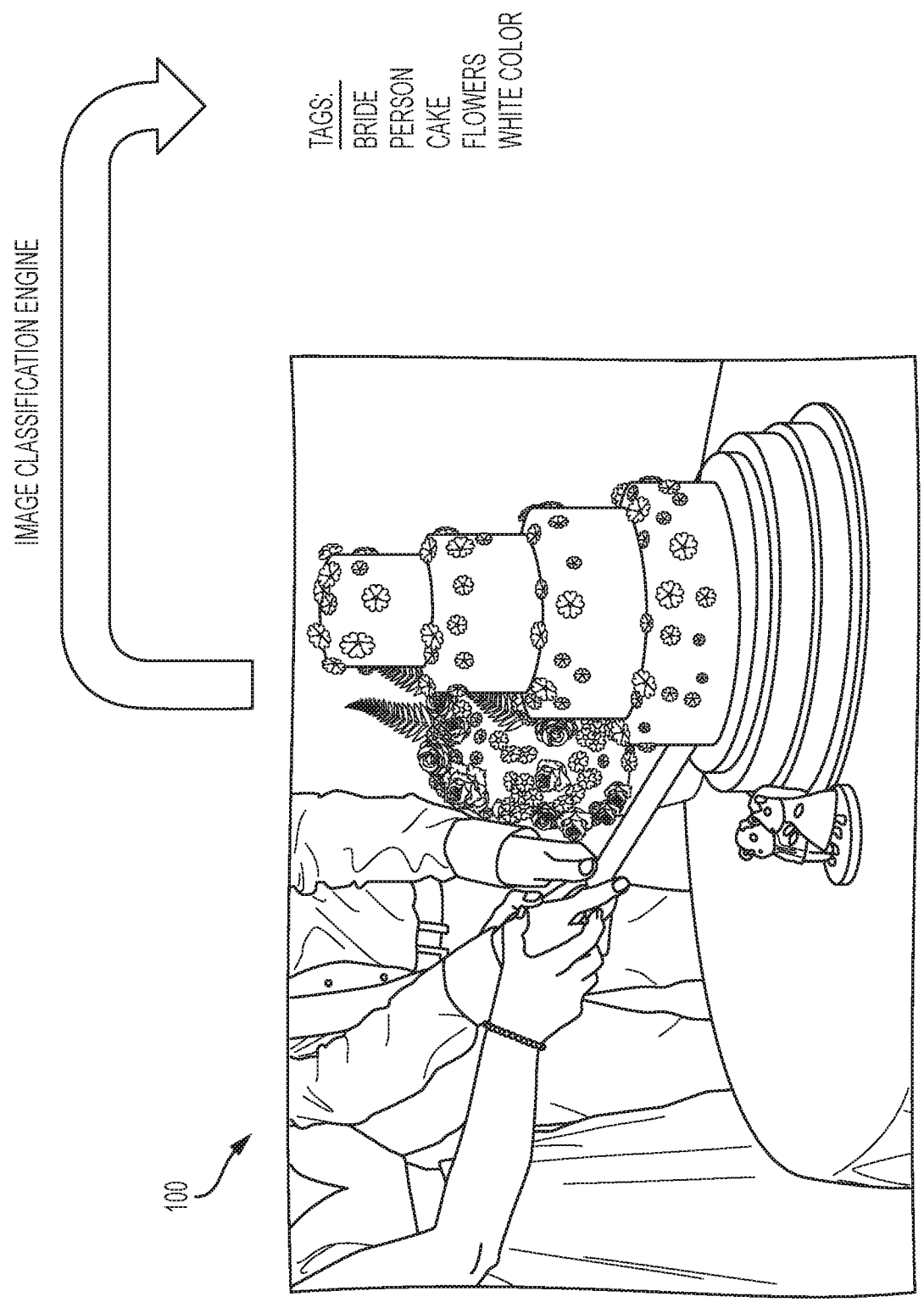
FIG. 1 (Prior Art) shows an illustrative image that can be tagged using the methods disclosed herein in accordance with aspects of the invention.

Turning now to FIG. 1 (Prior Art), an illustrative image 100 that can be tagged using the methods disclosed herein is generally shown in accordance with an embodiment. The illustrative image 100 shows a wedding scene with a bride and a groom gathered around a wedding cake. An image classification engine can be used to extract various tags that denote features of the image. Examples of tags include: "bride", "person", "veil", "cake", "white color", and "flowers". While these tags can be extracted directly from the image, they do not on their own provide an overall context of the image. For example, a tag that provides an appropriate context for the image would could be "wedding".

Figure 2:
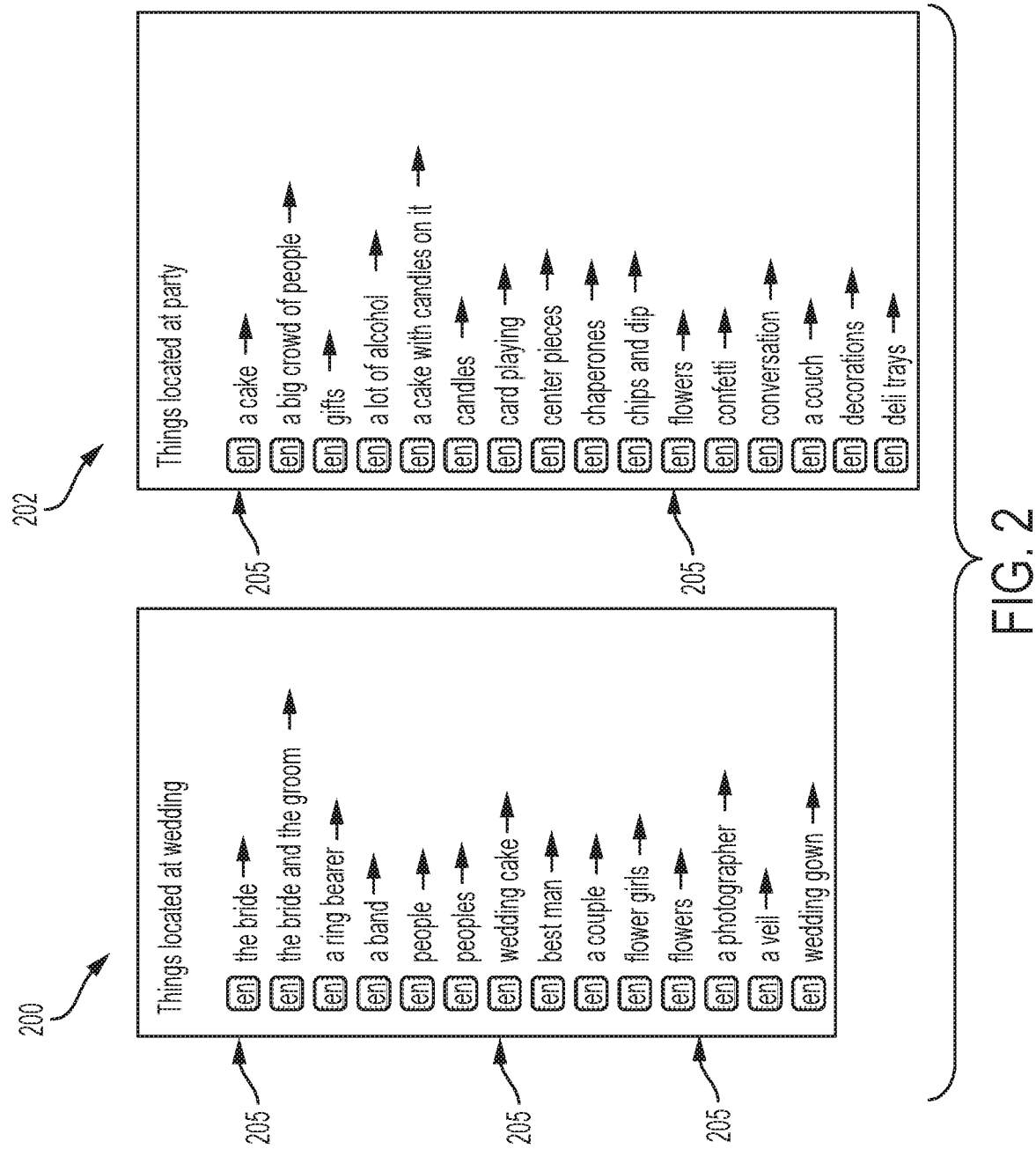
FIG. 2 shows a partial representation of various databases which can be used to generate a knowledge graph related to the image of FIG. 1 in accordance with aspects of the invention.

FIG. 2 shows a partial representation of various databases 200, 202 which can be used to generate a knowledge graph related to the image 100 of FIG. 1 from the tags extracted from the image 100. The databases 200, 202 provide a relation between higher order concepts, such as "wedding" and "party" and those items associated with this high-order concepts. For example, database 200 includes a listing of items that might be found at a wedding, while database 202 includes a listing of items that might be found at a party. By locating the tags within these databases (as shown by arrows 205), one can produce a relation between tags and higher-order concept that can be used to form a knowledge graph. Since the databases 200 and 202 are shown only in partial representation, it is clear that some tags, such as "flowers" and "cake" can be found both databases 200 and 202. In addition, tags will appear in various databases having higher order concepts that may not be related to the image. A knowledge graph can be created once the tags have been located within the databases. The knowledge graph compiles the relations between the various tags and the higher-order concepts of the databases.

Figure 3:
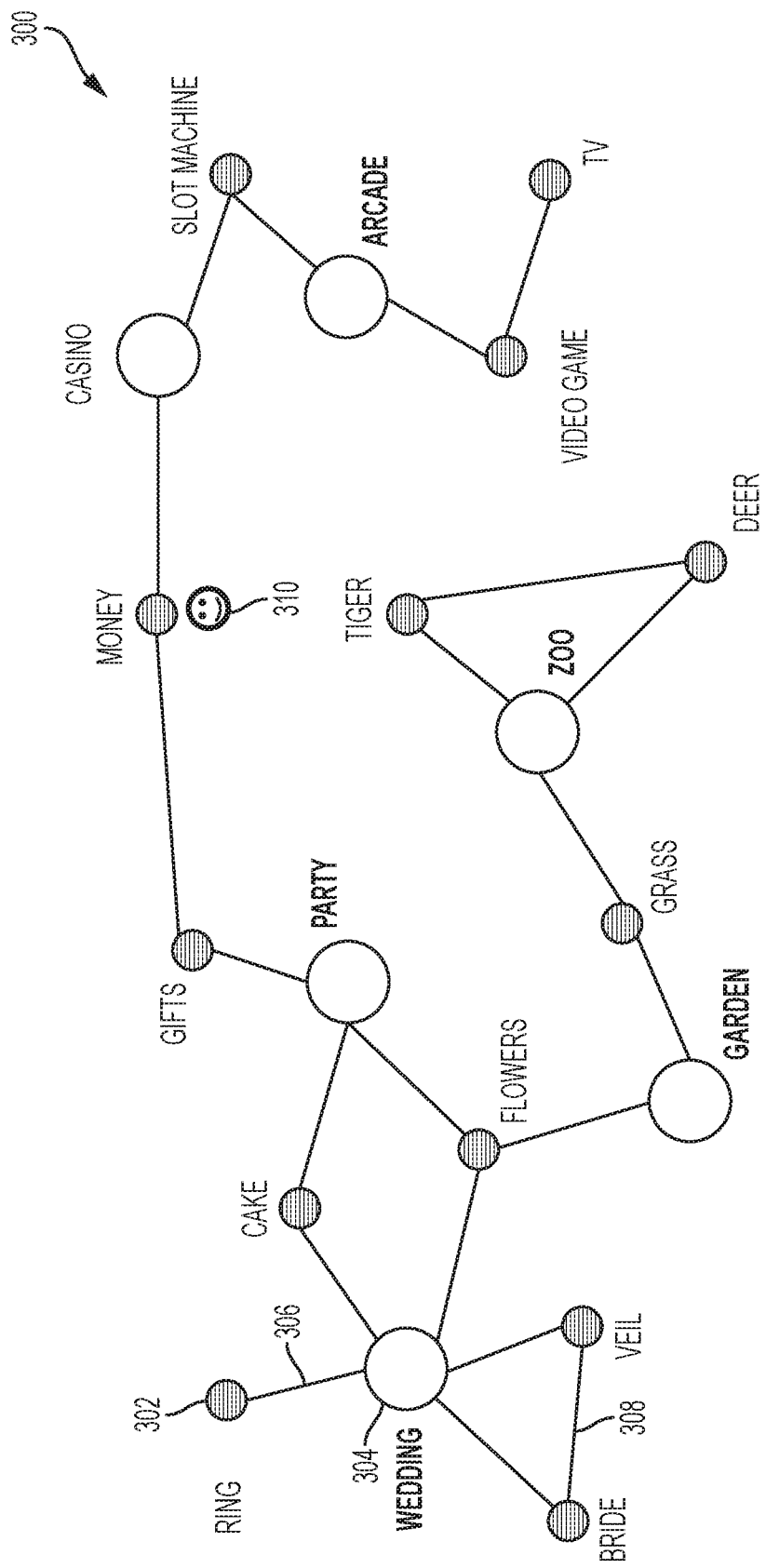
FIG. 3 shows an illustrative knowledge graph that links the higher-order concepts and tags obtained from the image and various databases.

FIG. 3 shows an illustrative knowledge graph 300 that links the higher-order concepts and tags obtained from the image 100 and various databases. The knowledge graph 300 includes a plurality of nodes (e.g., "bride", "flowers", "ring") that represent that tags of FIG. 1. The knowledge graph 300 further includes various nodes representing the high-order concepts from the various databases. For example, the knowledge graph 300 includes concept nodes "Wedding" and "Party" from the database 200 and 202, respectively, as well as additional concept nodes, (i.e., "Garden", "Arcade", "Zoo", "Casino"). A line connecting one node of the knowledge graph 300 to another node of the knowledge graph 300 is referred to as an edge of the knowledge graph 300. For example, edge 306 connects the node "ring" (302) to the concept node "wedding" (304). As can be seen in the knowledge graph 300. An edge can also connect a node to another node that is not a concept node, such as the edge 308 which connects the node "bride" to the node "veil."

Once the knowledge graph 300 has been established, a random walk/teleportation process is performed to traverse the knowledge graph 300 in order to determine a rank for the concept nodes. A marker 310 shows a randomly selected location in the knowledge graph 300 from which to start the random walk/teleportation process. At each iteration, the random walk/teleportation process can either perform a random walk through the graph based on the current location of the marker 310 or can "teleport" through the graph by moving to a randomly selected node of the knowledge graph 300. A random walk includes moving from one node to an adjacent node based on an outcome of a probabilistic event. Teleportation is the action of jumping from one node to any other node of the graph, without passing through intermediate nodes. In various embodiments, the random walk process is performed according to Eq. (1):

$$\pi = (1-\alpha)A\pi + \alpha p \qquad \text{Eq. (1)}$$

where $\pi$ represents a node in the graph, $\alpha$ represents a teleportation probability, p is a teleportation vector and A is a transition probability. The right-hand side of the Eq. (1) describes a probability $\alpha$ of teleportation throughout the graph and a probability $(1-\alpha)$ of performing a random walk. For a random walk, the transition probability A for the random walk is applied to the current node $\pi$ in order to move to another node. For teleportation, the teleportation vector p is used to select the next node.

Figure 4:
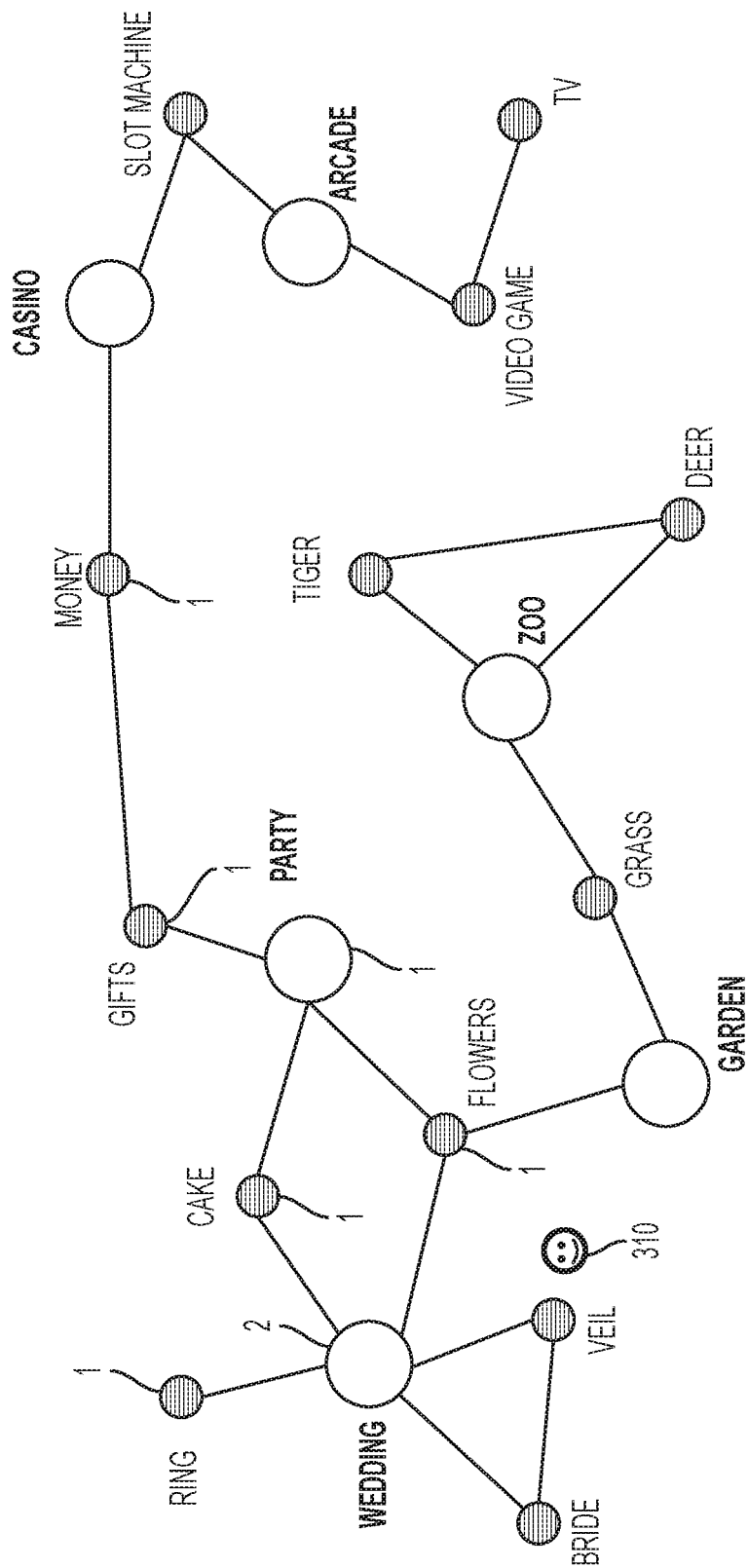
FIG. 4 shows the results of a random walk/teleportation process over the knowledge graph.

FIG. 4 shows the results of several iterations of the random walk/teleportation process of Eq. (1) over the knowledge graph 300 using the starting point of marker 310. Each node is labelled a rank or score that tracks the number of times that the marker 310 lands on the node during the random walk/teleportation process. In FIG. 4, marker 310 is currently at the node labelled ("veil").

Figure 5:
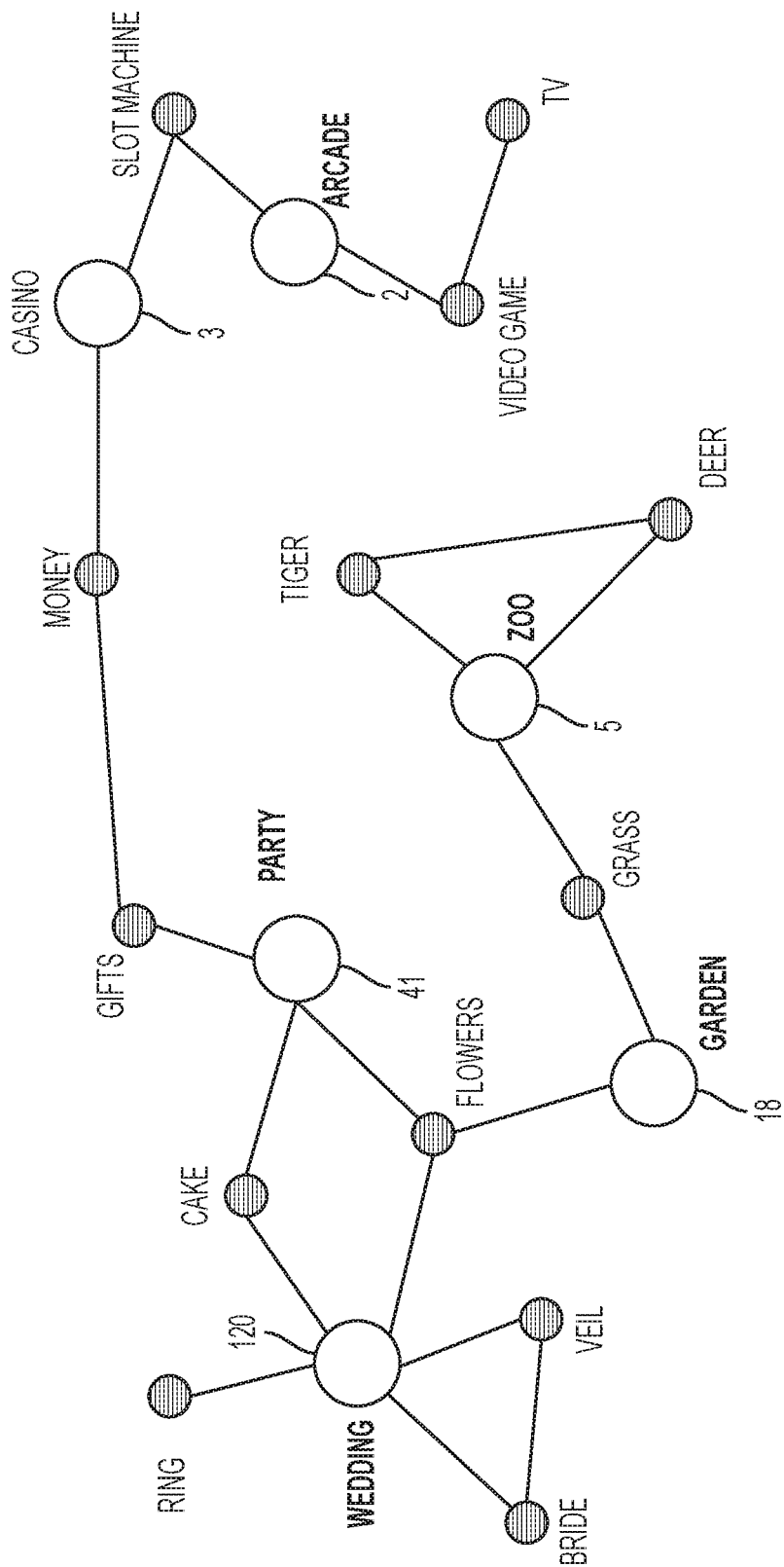
FIG. 5 shows the knowledge graph of FIG. 3 with ranks determined by repeating the random walk/teleportation process a selected number of times.

FIG. 5 shows the knowledge graph 300 of FIG. 3 with ranks determined by repeating the random walk/teleportation process a selected number of times. As the length of the random walk increases, those concept nodes that are more relevant to the image 100 (i.e., "wedding", "party") begin to accumulate a higher rank (i.e., 120, 41, respectively) than those concept nodes (i.e., "Garden", "Arcade", "Zoo", "Casino") that are less relevant to the image 100. The random walk/teleportation process can be repeated until a convergence of the ranks. A convergence can may occur when the change in the relative values of the ranks at the concept nodes is less than a selected criterion. Once the convergence occurs, those concept nodes having the highest ranks can be selected to form a relevance subgraph. The number of concept nodes selected for the relevance subgraph can be a determined by an operator or user.

Figure 6:
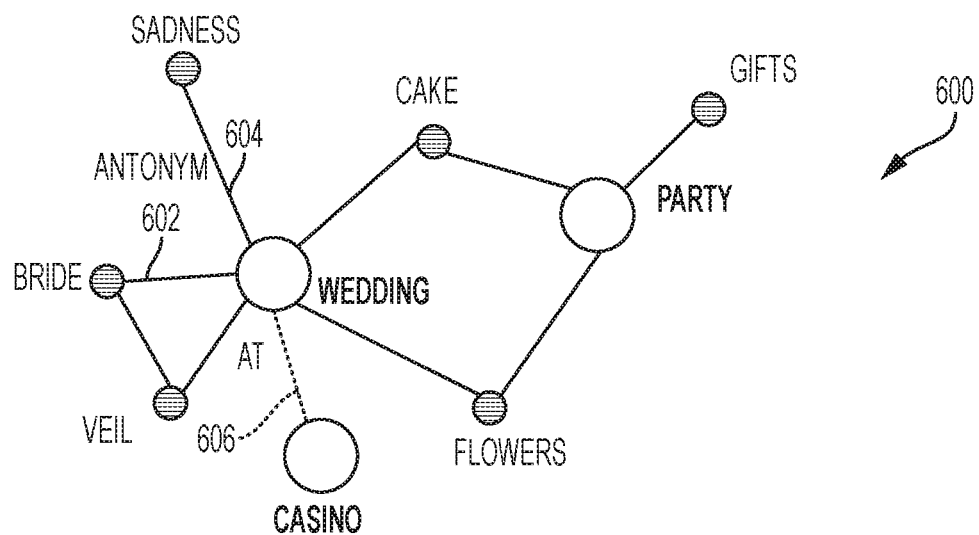
FIG. 6 shows a relevance subgraph obtained from the knowledge graph.

FIG. 6 shows a relevance subgraph 600 obtained from the knowledge graph 300. The relevance subgraph 600 is a subgraph of the knowledge graph 300 that includes those selected concept nodes having the highest ranks, as well as their related nodes. The relevance subgraph 600 of FIG. 6 includes the context nodes with the two highest scores (i.e., "Wedding", "Party") as well as their associated nodes. The relevance subgraph 600 includes edges that provides a positive relation between nodes. For example, edge 602 relates that "bride" is at a "wedding". Other edges may provide an antonym-type relation. For example, edge 604 relates that a "sadness" does not occur at a "wedding". Other edges may indicate an irrelevance between nodes. For example, an edge 606 relates that a "wedding" is irrelevant to a "casino".

Figure 7:
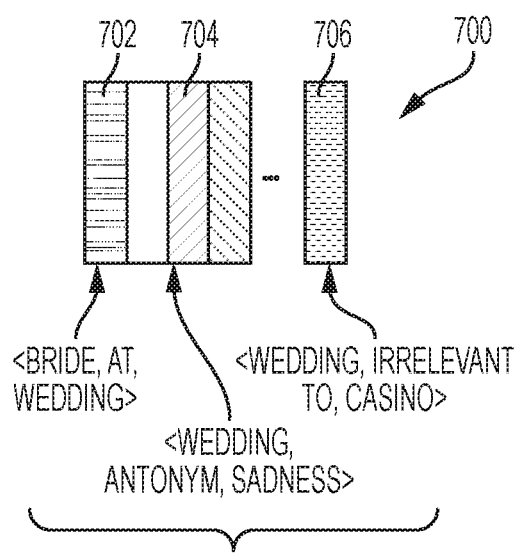
FIG. 7 illustrates an embedding process that embeds the edges of the relevance subgraph into a matrix.

FIG. 7 illustrates an embedding process that embeds the edges of the relevance subgraph 600 into a matrix 700. Illustrative vectors are shown. Referring to FIG. 6 and FIG. 7, edge 602 from the relevance subgraph 600 is embedded as a vector 702 (<veil, at, wedding>) in matrix 700 that provides a relation between node "veil" and context node "wedding". The matrix 700 permits antonym and irrelevance relations as well. Edge 604 is embedded as antonym vector 704 (<wedding, antonym, sadness>) that indicates an antonym relation between node "wedding" and node "sadness". Edge 606 is embedded as irrelevance vector 706 (<wedding, irrelevant, casino) to indicate an irrelevant relation between the node "wedding" and the node "casino".

Figure 8:
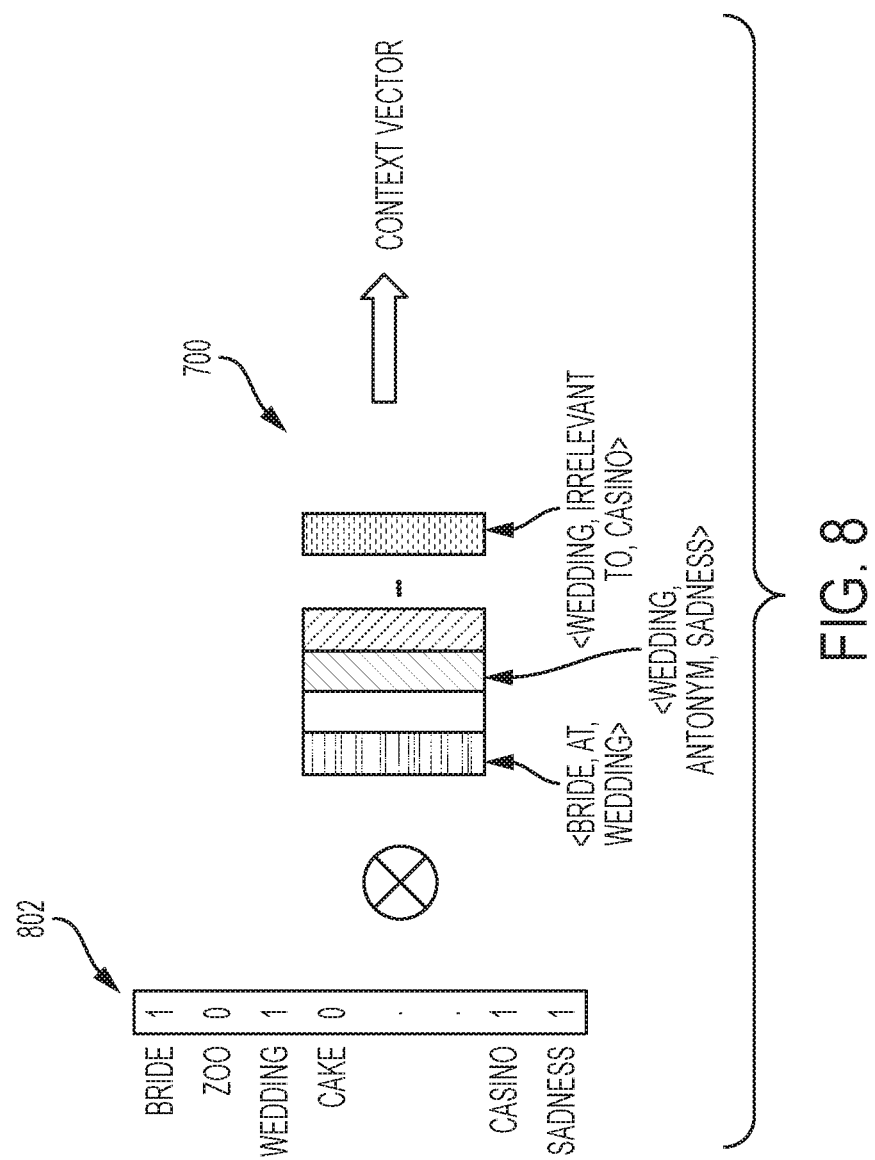
FIG. 8 illustrates a method for generating a context vector from the matrix of FIG. 7.

FIG. 8 illustrates a method for generating a context vector from the matrix 700 of FIG. 7. A feature vector 802 applied to the matrix 700 in order to select relevant vectors (edges) from the matrix 700. A feature vector 802 is a vector extracted from the image using various image processing methods. In various embodiments, a neural network can be used to extract the feature vector from the image. The neural network translates pixels of the image into a vector space of the image, thereby producing the feature vector. The feature vector is a fixed length vector description of the image content.

The feature vector 802 can be applied to the matrix 700 using a soft attention mechanism by computing a dot product of the feature vector 802 to the matrix 700 resulting in a soft mask of values between zero and one. Once the relevant vectors have been extracted from the matrix 700, a weighted combination of the vectors is used to generate a context vector. The context vector can be used to tag the image, to augment a training system for tagging the image or improve an accuracy of a tagging process.

Figure 9:
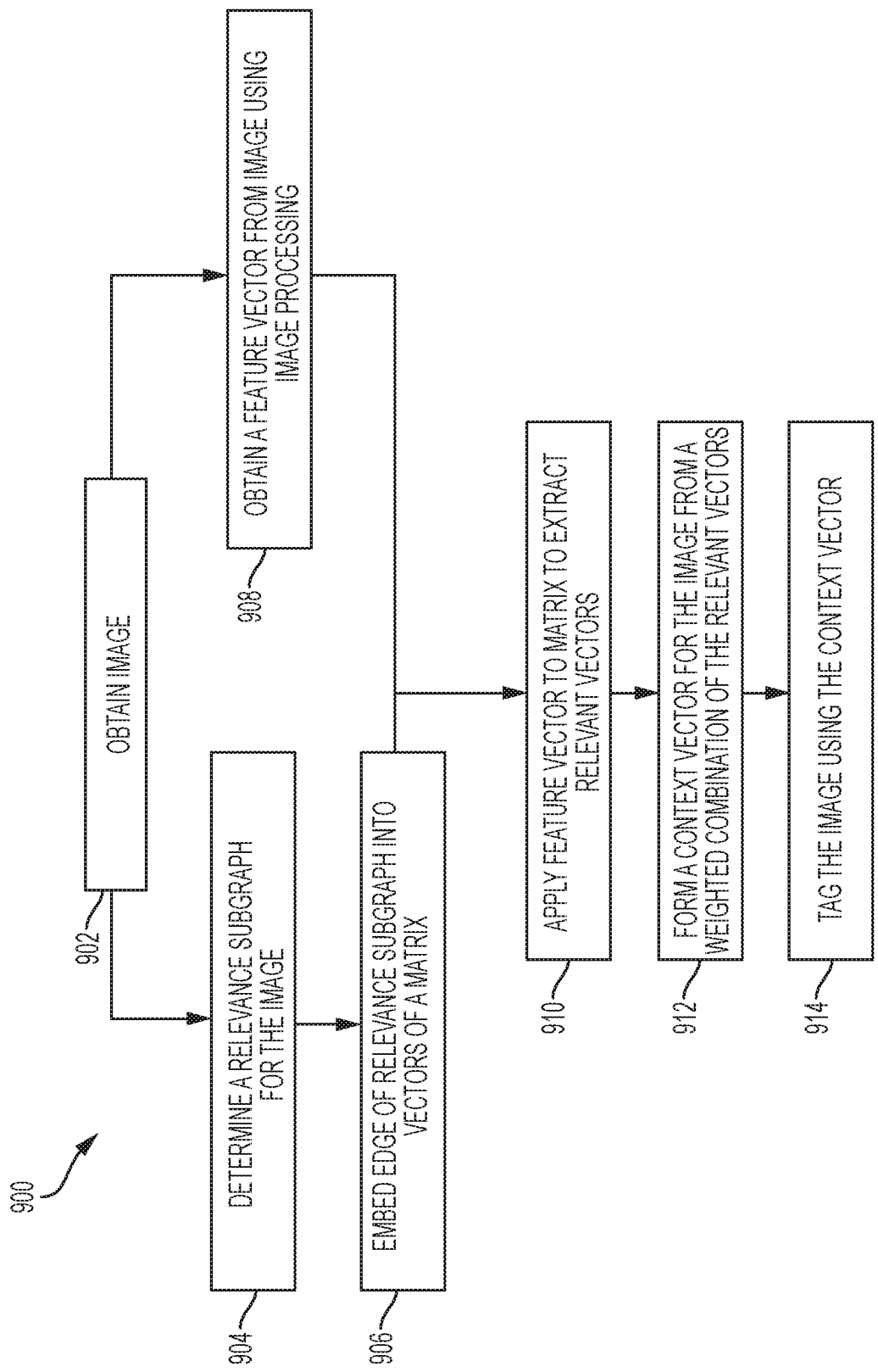
FIG. 9 shows a flowchart illustrating a method of determining a context vector for an image.

FIG. 9 shows a flowchart 900 illustrating a method of determining a context vector for an image. In box 902, an image is obtained. In box 904, a relevance subgraph is determined for the obtained image. In box 906, edges of the relevance subgraph are embedded into vectors of a matrix. In box 908 a feature vector is extracted from the image using a suitable neural network. In box 910, the feature vector is applied to the matrix in order to extract relevant vectors from the matrix. In box 912, a weighted combination of the relevant vectors are used to form a context vector for the image. In box 914, the image is tagged using the context vector.

Figure 10:
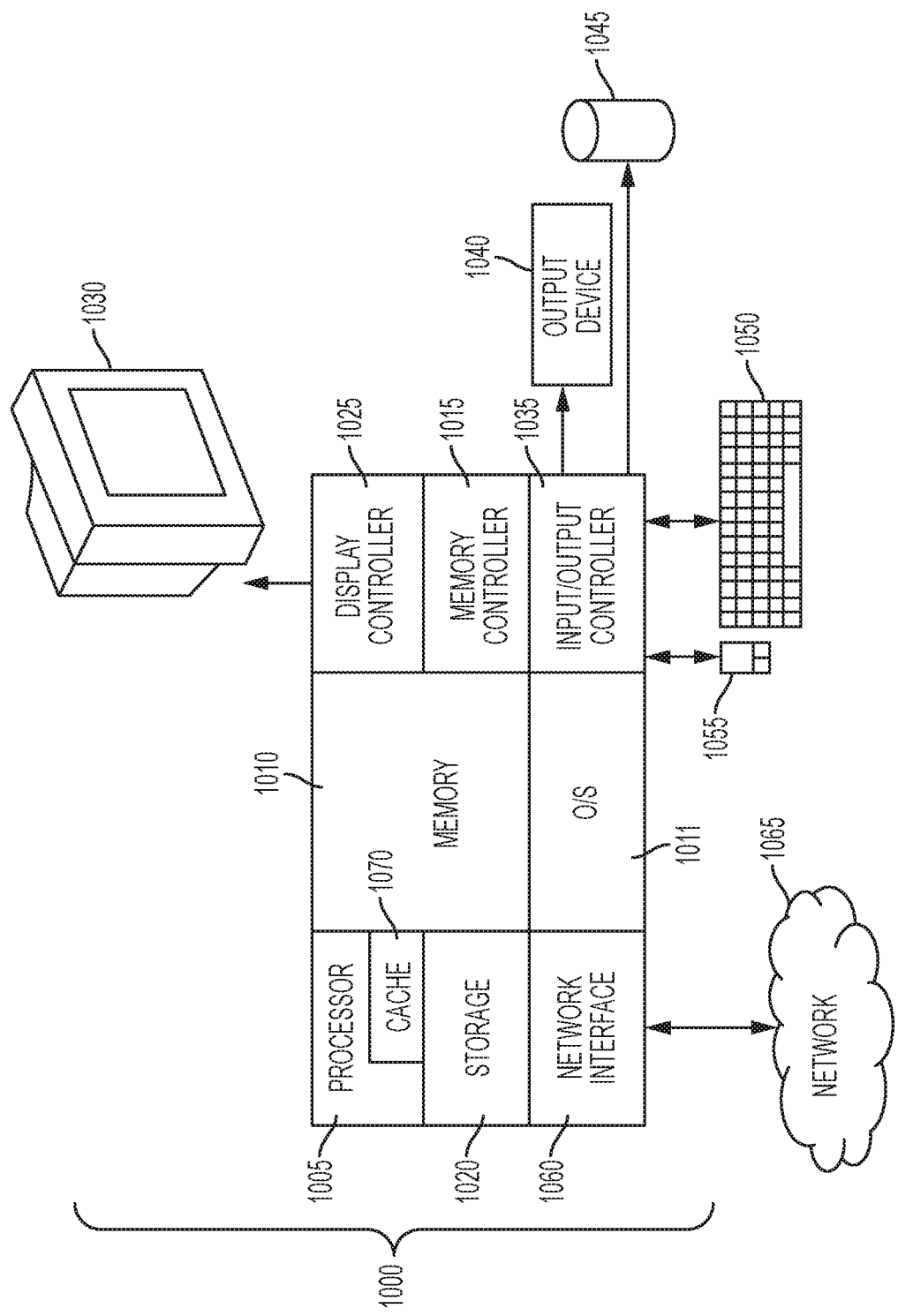
FIG. 10 depicts a block diagram of a computer system for implementing some or all aspects of the system, according to some embodiments of this disclosure.

FIG. 10 illustrates a block diagram of a computer system 1000 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 1000, such as a personal computer, workstation, minicomputer, or mainframe computer.

In some embodiments, as shown in FIG. 10, the computer system 1000 includes a processor 1005, memory 1010 coupled to a memory controller 1015, and one or more input devices 1045 and/or output devices 1040, such as peripherals, that are communicatively coupled via a local I/O controller 1035. These devices 1040 and 1045 may include, for example, a printer, a scanner, a microphone, and the like. Input devices such as a conventional keyboard 1050 and mouse 1055 may be coupled to the I/O controller 1035. The I/O controller 1035 may be, for example, one or more buses or other wired or wireless connections, as are known in the art. The I/O controller 1035 may have additional elements, which are omitted for simplicity, such as controllers, buffers (caches), drivers, repeaters, and receivers, to enable communications.

The I/O devices 1040, 1045 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1005 is a hardware device for executing hardware instructions or software, particularly those stored in memory 1010. The processor 1005 may be a custom made or commercially available processor, a central processing unit (CPU), an auxiliary processor among several processors associated with the computer system 1000, a semiconductor based microprocessor (in the form of a microchip or chip set), a macroprocessor, or other device for executing instructions. The processor 1005 includes a cache 1070, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 1070 may be organized as a hierarchy of more cache levels (L1, L2, etc.).

The memory 1010 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, or other types of storage media. Note that the memory 1010 may have a distributed architecture, where various components are situated remote from one another but may be accessed by the processor 1005.

The instructions in memory 1010 may include one or more separate programs, each of which comprises an ordered listing of executable instructions for implementing logical functions. In the example of FIG. 10, the instructions in the memory 1010 include a suitable operating system (OS) 1011. The operating system 1011 essentially may control the execution of other computer programs and provides scheduling, input-output control, file and data management, memory management, and communication control and related services.

Additional data, including, for example, instructions for the processor 1005 or other retrievable information, may be stored in storage 1020, which may be a storage device such as a hard disk drive or solid state drive. The stored instructions in memory 1010 or in storage 1020 may include those enabling the processor to execute one or more aspects of the systems and methods of this disclosure.

The computer system 1000 may further include a display controller 1025 coupled to a display 1030. In some embodiments, the computer system 1000 may further include a network interface 1060 for coupling to a network 1065. The network 1065 may be an IP-based network for communication between the computer system 1000 and an external server, client and the like via a broadband connection. The network 1065 transmits and receives data between the computer system 1000 and external systems. In some embodiments, the network 1065 may be a managed IP network administered by a service provider. The network 1065 may be implemented in a wireless fashion, e.g., using wireless protocols and technologies, such as WiFi, WiMax, etc. The network 1065 may also be a packet-switched network such as a local area network, wide area network, metropolitan area network, the Internet, or other similar type of network environment. The network 1065 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 1000, such as that illustrated in FIG. 10.

Technical effects and benefits of some embodiments include improving a tagging process of an image, and improved training of a network in order to tag an image The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for tagging an image, the computer-implemented method comprising:
   generating, by an image classification engine stored in one or more memories of the one or more computing devices, a plurality of tags for the image, wherein one or more of the plurality of tags include a word that denotes an item depicted in the image;
   generating a relevance subgraph for the image based at least in part on the plurality of tags for the image;
   embedding, using an embedding engine, the nodes and edges of the relevance subgraph into fixed dimension vectors of a matrix;
   determining, using a neural network stored in one or more memories of the one or more computing devices, the neural network engine used to generate, a feature vector from the image;
   applying, using a processor, the feature vector to the matrix to generate a context vector for the image; and
   using the context vector to tag the image.

2. The computer-implemented method of claim 1, wherein applying the feature vector to the matrix selects relevant edges from the matrix further comprises generating the context vector from a weighted combination of the selected relevant edges.

3. The computer-implemented method of claim 1 further comprising: applying the feature vector to the matrix using soft attention.

4. The computer-implemented method of claim 1, wherein embedding the relevance subgraph into the fixed dimension vector maintains a structure of the relevance subgraph.

5. The computer-implemented method of claim 4, wherein the fixed dimension vectors permits negative relations between nodes of the relevance subgraph.

6. The computer-implemented method of claim 4, wherein the fixed dimension vector permits a non-transitive relation between nodes of the relevance subgraph.

7. The computer-implemented method of claim 1 further comprising: using the context vector to improve a selection process for tagging the image.

8. A system for tagging an image, the system comprising:
   a memory having computer readable instructions; and
   one or more processors for executing the computer readable instructions, the computer readable instructions configured to perform a method comprising:
   generating a plurality of tags for the image, wherein one or more of the plurality of tags include a word that denotes an item depicted in the image;
   generating a relevance subgraph from the image based at least in part on the plurality of tags, the subgraph having a plurality of nodes and edges;
   embedding the nodes and edges of the relevance subgraph in a fixed dimension vector;
   determining a feature vector from the image;
   applying the feature vector to the fixed dimension vector to generate a context vector for the image; and
   using the context vector to tag the image.

9. The system of claim 8, wherein the method performed by the computer readable instructions further comprises extracting the feature vector using semantic image processing.

10. The system of claim 8, wherein the method performed by the computer readable instructions further comprises applying the feature vector to the fixed dimensions vectors using soft attention.

11. The system of claim 8, wherein the method performed by the computer readable instructions further comprises embedding the relevance subgraph into the fixed dimension vector while maintaining a structure of the relevance subgraph.

12. The system of claim 11, wherein the fixed dimension vector permits negative relations between nodes of the relevance subgraph.

13. The system of claim 11, wherein the fixed dimension vector permits non-transitive relations between nodes of the relevance subgraph.

14. The system of claim 8, wherein the method performed by the computer readable instructions further comprises using the context vector to improve a selection process for tagging the image.

15. A computer program product for tagging an image, the computer program product comprising a non-transitory computer readable storage medium having program instructions embodied therewith, the program instructions executable by a processor to cause the processor to perform:
   generating a plurality of tags for the image, wherein one or more of the plurality of tags include a word that denotes an item depicted in the image;
   generating a relevance subgraph from the image based at least in part on the plurality of tags, the subgraph having a plurality of nodes and edges;
   embedding the nodes and edges of the relevance subgraph in a fixed dimension vector;
   determining a feature vector from the image;
   applying the feature vector to the fixed dimension vector to generate a context vector for the image; and
   using the context vector to tag the image.

16. The computer program product of claim 15 further comprising: extracting the feature vector using semantic image processing.

17. The computer program product of claim 15 further comprising: applying the feature vector to the fixed dimensions vectors using soft attention.

18. The computer program product of claim 15 further comprising: embedding the relevance subgraph into the fixed dimension vector while maintaining a structure of the relevance subgraph.

19. The computer program product of claim 18, wherein the fixed dimension vector permits negative relations between nodes of the relevance subgraph.

20. The computer program product of claim 18, wherein the fixed dimension vector permits non-transitive relations between nodes of the relevance subgraph.

* * * * *